May 16, 1950
D. G. MERRILL
2,507,673
APPARATUS FOR AND METHOD OF
CONTROLLING DRIFT IN LEHRS
Filed June 26, 1946
4 Sheets-Sheet 3
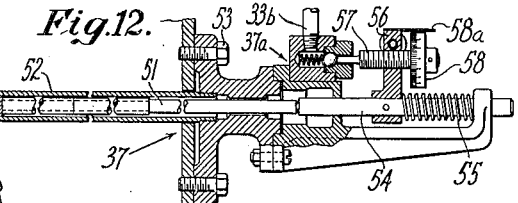
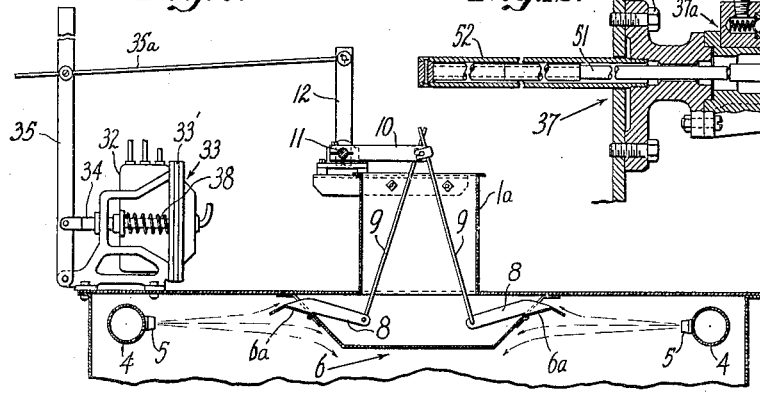
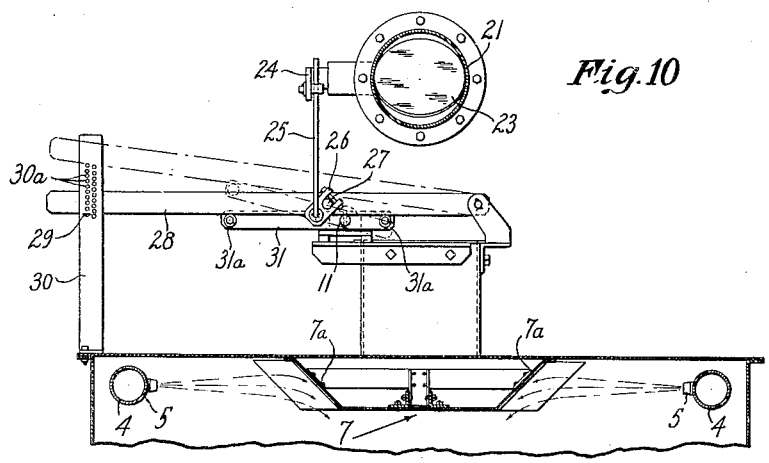
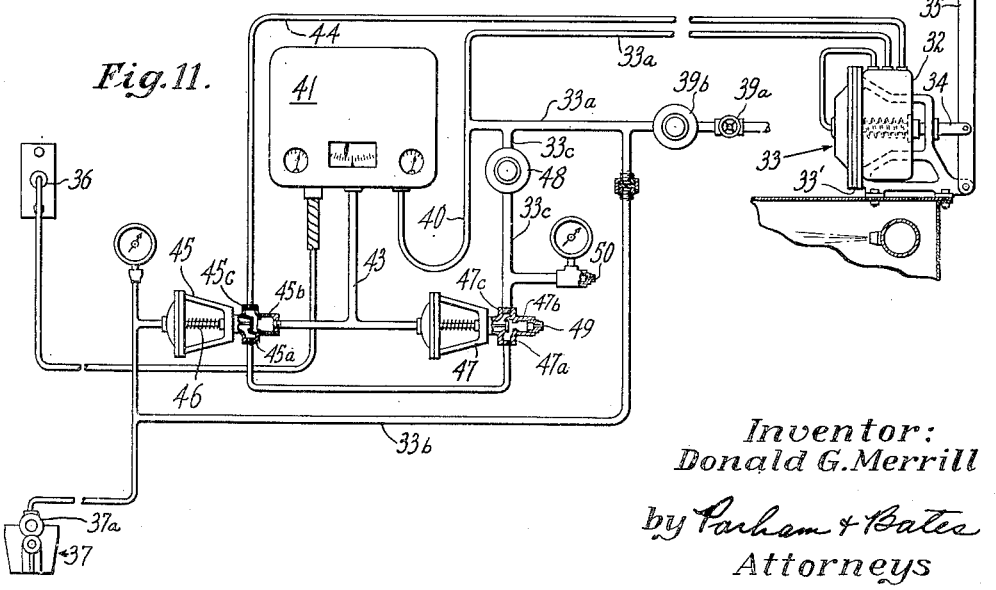
*Inventor:*
*Donald G. Merrill*
by *Parham & Bates*
*Attorneys*

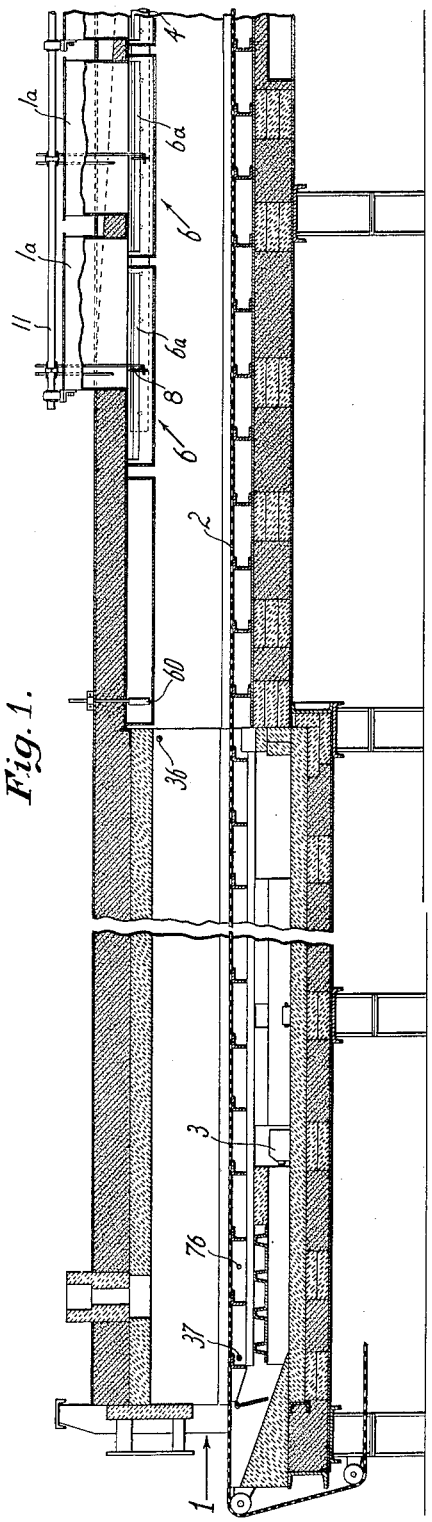

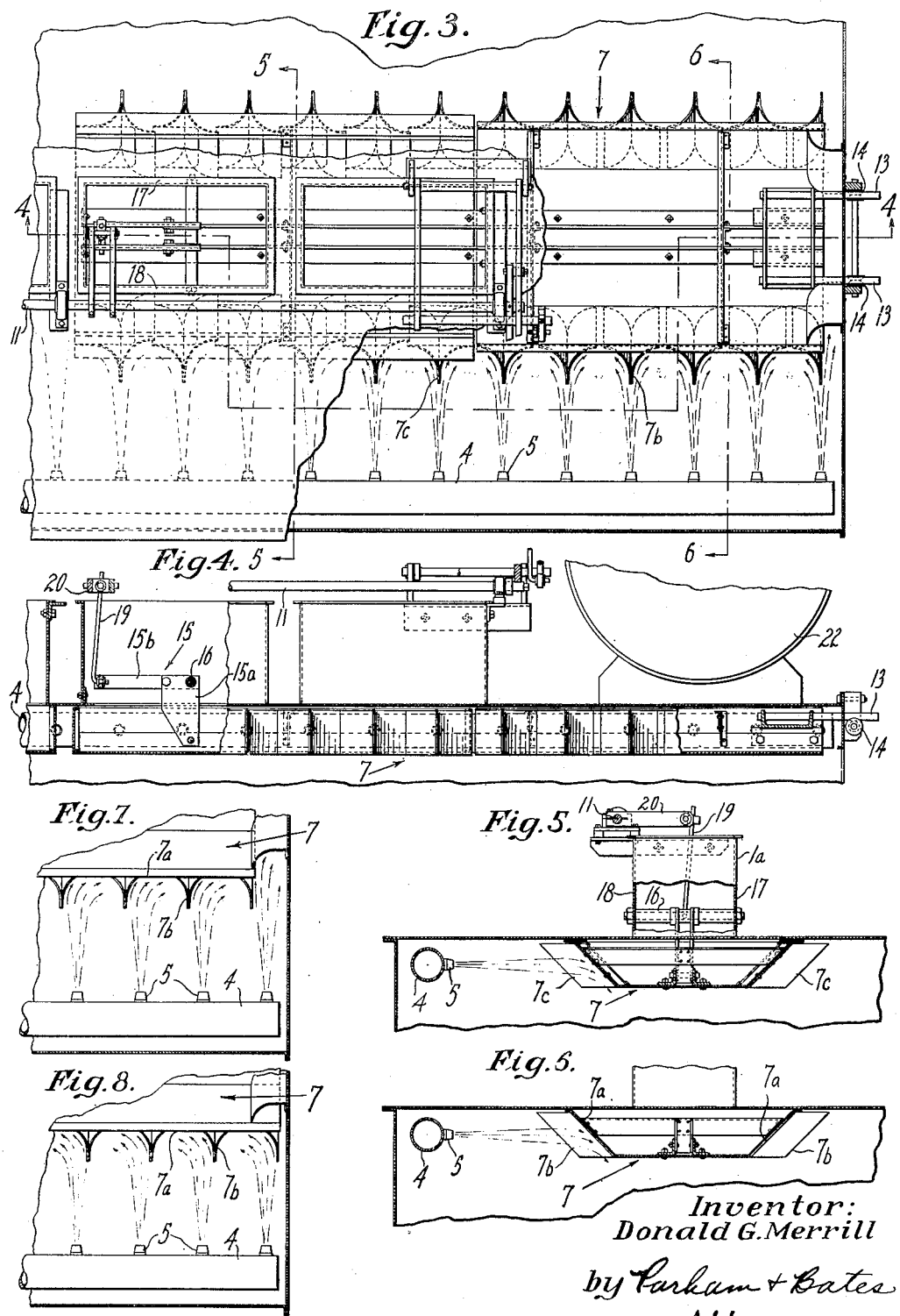

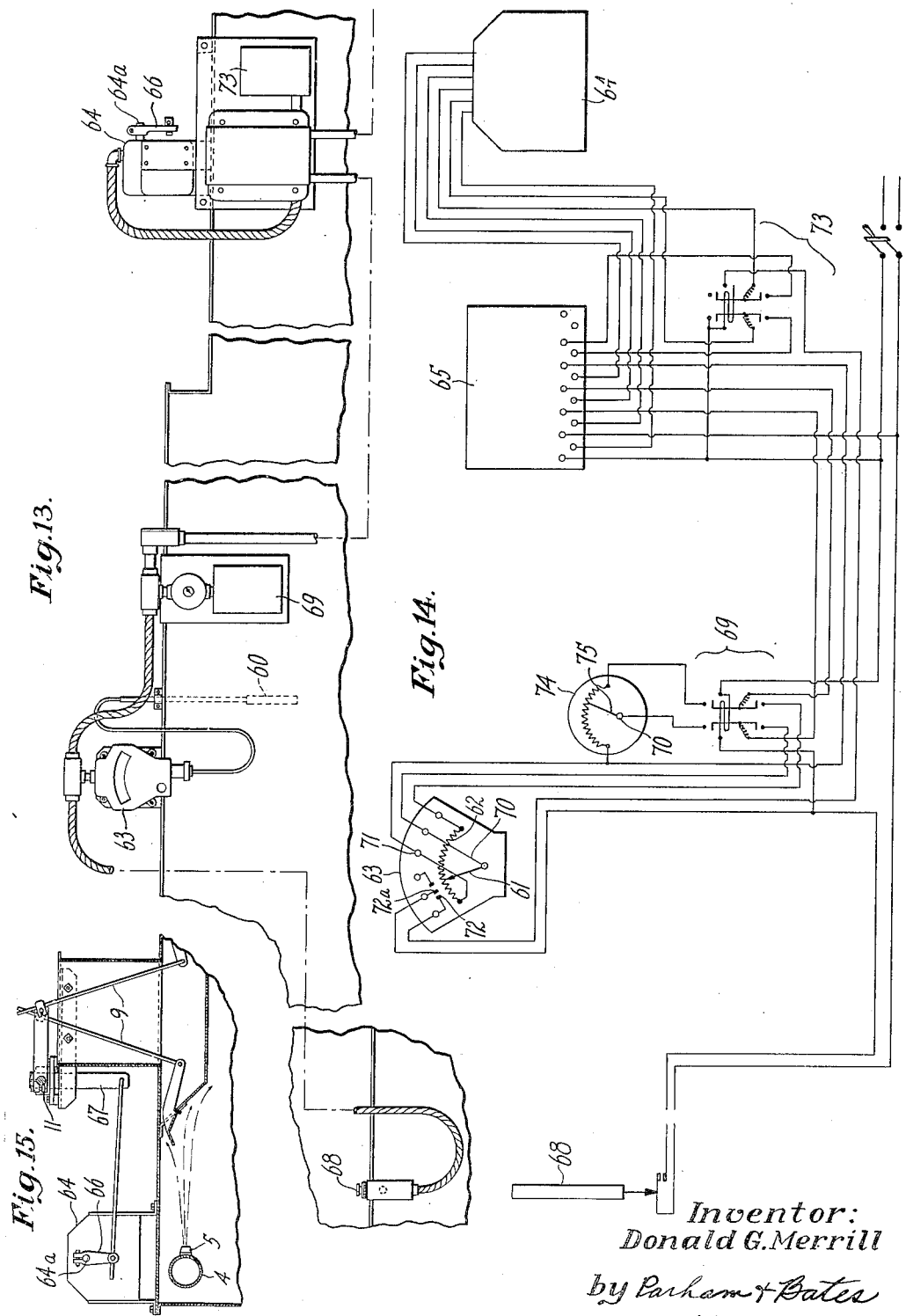

Patented May 16, 1950

2,507,673

UNITED STATES PATENT OFFICE 2,507,673

APPARATUS FOR AND METHOD OF CONTROLLING DRIFT IN LEHRS

Donald G. Merrill, West Hartford, Conn., assignor to Hartford-Empire Company, Hartford, Conn., a corporation of Delaware Application June 26, 1946, Serial No. 679,522

16 Claims. (Cl. 49—47)

This invention relates to methods and apparatus for controlling longitudinal movement or drift in the tunnels of lehrs or the like and to improvements in such methods and apparatus which enable a closer control of drift and temperature in a lehr than heretofore has been obtainable by the methods and devices of the prior art.

An object of the invention is to provide, as in a lehr tunnel having a source of heat, a close control of temperature at two points, one adjacent the source of heat and the other remote from it, and of the temperature gradient between the points.

A further object of the present invention is to provide an improved automatic drift control for use in preheating a lehr after it has been shut down for a period and in maintaining the desired temperature gradient in the tunnel during a period in which no ware is going through, or in which the heat imput per unit of time is relatively low.

A still further object of the invention is to provide a drift control mechanism which will act automatically in response to changes of temperature from predetermined temperatures at two control points in the lehr to establish and maintain desirable drift conditions therein without requiring manual control after the operation thereof has been initiated.

A further object of the invention is the provision of improved drift control mechanism, including a novel arrangement of drift control dampers and deflectors automatically regulated by temperature responsive elements, wherein the dampers and deflectors which are normally regulated by one of such elements, may be automatically regulated by a second element to control the drift.

Apparatus for accomplishing the above-recited, as well as other objects and advantages of the invention may be incorporated, for example, in a glassware annealing tunnel lehr or other heat treatment equipment having a heating zone and a cooling zone.

A temperature sensitive element is placed in the tunnel roof at a point between the heating zone and cooling zone. This element may be part of a control apparatus which includes a motor to actuate and automatically position drift inducing deflectors and dampers. Any departure of the temperature sensitive element located between the heating and cooling zones from a desired temperature is corrected by an automatically effected damper and deflector movement which creates an air movement in the tunnel from the hot end or from the cold end as required.

The force for moving this air is derived from cooling wind as it is blown into the cooling section. This wind is primarily regulated to meet the cooling requirements of the ware load. Means are provided to increase the wind automatically should the drift control require it. This is done by a mechanical linkage which opens a cooling blower blast gate at either extreme of the drift control damper motion.

When the heat from the glass load is insufficient to maintain the desired temperature, heat may be drawn from the hot end and a backward drift maintained. In extreme cases this may cool the hot end beyond the corrective capacity of the firebox. A breeze of unusual strength blowing against the front door might also cause this condition. Since a low temperature at the entrance is highly detrimental to annealing, this must be prevented. Accordingly, an auxiliary temperature responsive element is placed in the heating zone, which takes over the control from the element, located intermediate of the heating and cooling zones, when the temperature in the heating zone drops below a selected value. The control is then arranged to direct a maximum drift toward the hot end which will operate to raise the temperature at the entrance by counteracting the cold inflow and by carrying forward heat from further back in the tunnel.

If the above condition occurred, however, when the temperature in the cooling zone was already low or had persisted long enough for the strong forward drift to lower that temperature considerably, then drift would be sweeping heat from the tunnel faster than the firebox could supply it. A further device operates when the temperatures at both points are low to move the dampers and deflectors to an approximately neutral position, which is that shown by experience to interfere least with heating up. This device will function when burner operation is for some reason faulty and is also useful during startup periods as the drift control will automatically take over its normal functions as proper temperatures are reached.

In addition to the previously recited objects and advantages of such apparatus, other objects and advantages will hereinafter be pointed out or will become apparent from the following detailed description of illustrative practical embodiments of the invention as shown in the accompanying drawings, in which:

Figures 1 and 2 are views principally in longitudinal vertical section which, when arranged together in numerical order from left to right, illustrate the general construction of lehr having installed therein a drift control system embodying the invention;

Fig. 3 is a top plan view of a portion of the right hand or ware exit end of the lehr shown in Fig. 2 with a portion of the superstructure broken away so as to illustrate the construction and arrangement of one of the drift directing baffle or vane assemblies in its neutral position relative to a series of jet nozzles;

Fig. 4 is a vertical section taken through line 4—4 of the portion of the lehr shown in Fig. 3 without the superstructure removed;

Fig. 5 is a sectional view taken through line 5—5 of Fig. 3;

Fig. 6 is a view similar to Fig. 5 taken through line 6—6 of Fig. 3;

Fig. 7 is an enlarged fragmentary view of the lower right hand corner of Fig. 3, illustrating a portion of the vane assembly in its backward-drift inducing position relative to the jet nozzles;

Fig. 8 is a similar view illustrating a portion of the vane assembly in its forward-drift inducing position;

Fig. 9 is a view in transverse vertical section through line 9—9 of Fig. 2 illustrating a second type of drift inducing damper assembly operably connected to a pneumatic motor;

Fig. 10 is a similar view through line 10—10 of Fig. 2;

Fig. 11 is a schematic plan of a temperature responsive pneumatic system for controlling the motor shown in Fig. 9;

Fig. 12 is a cross-sectional view of a temperature responsive element suitable for incorporation in the system shown in Fig. 11;

Fig. 13 somewhat schematically illustrates a temperature responsive electrical control system which may be utilized alternatively for the pneumatic system of Fig. 11;

Fig. 14 is a wiring diagram for the system illustrated in Fig. 13; and

Fig. 15 is a fragmentary view similar to Fig. 9 of damper control linkage suitable for use with the electric motor of Figs. 13 and 14.

A lehr to which the invention may be applied is partly shown in Fig. 1 and includes a tunnel I through which, for example, glassware to be annealed may be transported by an upper or ware bearing strand of a suitable open-work conveyor 2, the lower or idle strand of which is returned beneath the lehr to the entrance end of the lehr tunnel.

For supplying heat to the tunnel of a lehr of the type shown in Fig. 1, a number of burner groups or units, one of which is indicated at 3, may be employed.

Cooling air may be introduced into the cooling portion of the tunnel by suitable pipes 4 which, as shown by Figs. 1, 2, 9 and 10, may extend longitudinally of the cooling portion of the tunnel in the upper corners thereof. The pipes 4 have spaced nozzles 5 which may be directed toward the longitudinal median line of the tunnel above the path of the ware on the conveyor 2. The jets of air from these nozzles may be deflected downwardly in whole or in part, by the inclined sides of deflectors which are located in the upper portion of the cooling section of the ware tunnel, intermediate the sides thereof.

While a single type of deflector assembly may be employed, the illustrated embodiments of the invention preferably employ two types of deflector assemblies which are indicated by the numerals 6 and 7. The deflector assembly 7 is disposed rearwardly in the lehr adjacent the ware outlet end, and the deflector assemblies 6 are forward thereof. The two types of deflector assemblies are described more in detail hereinafter.

Referring more particularly to Figs. 1 and 9, the upper portions of the deflector assemblies 6 or some of them may include hinged sections or dampers 6a. Each damper is provided with a rigid arm 8 which is operatively connected by a link 9 to a crank arm 10 secured to an axle 11. Each link 9 extends through a suitable opening or stack 1a in the roof of the lehr 1 so that the crank arm 10, axle 11 and suitable operating mechanism, including an operating arm 12 for imparting a rocking movement to the axle 11, are disposed above and outside the lehr tunnel. While the deflector dampers 6a are illustrated as being operated in unison, it will be understood that any known expedient may be employed to permit or cause different movements with respect to the several dampers 6a in response to a given rocking movement of the control axle 11.

As illustrated in detail in Figs. 2 through 8, the deflector assembly 7 comprises a pair of longitudinally extending and transversely spaced inwardly and downwardly sloping connected deflector plates 7a to which are attached curved deflector blades. The rearmost deflector blades 7b, act merely as splitters which divide the streams of air from the nozzles 5 in variable proportions between forward and backward flow, while deflecting the flow downward into the tunnel. This type of deflector blade or vane is particularly effective in producing longitudinal air movements. The same general type of deflector blade or vane in a slightly modified form is designated by the numeral 7c. The blades 7c are disposed forwardly of the blades 7b and not only divide and direct the air stream, but discharge a part at least of the rearwardly directed portion out of the roof of the lehr while deflecting the forward components downwardly into the tunnel.

The deflector assembly 7 may be moved relative to the nozzles 5 so as to induce either forward drift combined with strong cooling effects or a backward drift with a minimum of tunnel cooling. More particularly, the deflector assembly 7 is mounted for longitudinally reciprocable movement and to that end is rearwardly sustained by a pair of projecting rails 13 supported on rollers or spools 14. The forward end of the assembly is pivotally supported by an arm 15a of a bell crank 15 which is pivotally mounted on a transversely extending shaft 16 secured at its ends in the side walls 17 and 18 of an exhaust stack 1a. The other arm 15b of the bell crank 15 is connected by a rod 19 to a crank arm 20 secured to the axle 11. Rocker movement of the latter in a clockwise direction (Fig. 5) lowers the connecting rod 19 and moves the deflector assembly 7 rearwardly to position the deflector blades 7b as illustrated in Fig. 3 so as to deflect the jets from the nozzles 5 forward and create a forward current or drift in the tunnel. Similarly, counterclockwise rotation of the axle 11 raises the connecting rod and moves the deflector 7 forwardly so as to move the deflector vanes to the position relative to the nozzles illustrated in Fig. 7, thereby creating a reverse current or drift in the tunnel. Whereas the deflector blades 7c in their forward drift inducing position substantially confine the air currents in the tunnel, a considerable portion of the air jets is discharged out of the exhaust stacks 1a when the blades 7c are in their reverse or backward drift inducing positions.

The cooling air discharged by the nozzles 5 into the tunnel is supplied to the pipes 4 through a conduit 21 from a supply source such as the blower 22. The passage of air through the conduit 21 is regulated by a suitable damper 23 which may be of the butterfly type.

The setting of the damper 23 is regulated by rocker movement of the axle 11 through a connecting linkage hereinafter described with reference to Figs. 2 and 10 wherein the damper 23 is shown pivotally mounted transversely of the conduit 21. The damper is provided with a crank arm 24 connected by a rod 25 with a second crank arm 26. Arm 26 is adjustably secured to a pin 27 fixed to a long lever 28 intermediate the ends thereof. One end of lever 28 is pivotally supported on the lehr and the other end is supported in a well known manner by a pin 29 which may be moved to any one of a number of holes 30a in a support 30. With this arrangement the lever 28 may be manually adjusted to a level necessary to set the damper 23 so that at least the minimum amount of cooling air necessary to the operation of the lehr always is permitted to pass therethrough. However, if the temperature regulated drift control requires more cooling air, extreme rocker movement of the axle 11 in either direction will cause one or the other of a pair of rollers 31a secured to the ends of a rock shaft 31 adjustably fastened on the axle 11, to engage and raise the lever 28 and thereby further open the damper 23.

Rocking movement of the control axle 11 to open or close the damper 6a and simultaneously position the deflector assembly 7, and extreme rotation thereof to vary the setting of damper 23, is effected by the operation of a reversible motor.

In the embodiment illustrated in Figs. 9 and 11, a pneumatically actuated diaphragm motor 33 is used in which a diaphragm 33' is moved by regulated air pressure.

While a variety of motors of the type, which are responsive to fluid pressure changes, are available commercially, the presently described embodiment employs one which is coupled with a valve or motor positioner 32 such as shown in the Bristol Company Bulletin No. 535 (Feb. 1939).

The motor 33 includes a connecting rod 34 which communicates the movement of the motor diaphragm 33' through a linkage 35 and 35a, to the axle rocking arm 12. The arrangement is such that an increase in pressure on the motor diaphragm forces the rod 34, as viewed in Fig. 9, to the left and moves the dampers 6a and deflector assembly 7 towards their reverse-drift inducing positions. A decrease in pressure on the motor permits a spring 38 to force the rod 34 to the right and move the dampers 6a and deflector 7 towards their forward-drift inducing positions.

The control mechanism, hereinafter described with reference to Fig. 11, normally provides for a proportionate movement of the motor diaphragm 33' and connecting rod 34 in response to the slightest change in the temperature of a temperature responsive element 36 located in the lehr tunnel at a point intermediate the heating and cooling zones. A second temperature responsive element designated by the numeral 37 is located in the forward or heating zone of the lehr and operates under certain conditions as will be hereinafter explained to take over control from the temperature responsive element 36.

Each of the various control elements, diagrammatically shown in Fig. 11, may be standard commercial items, the novelty of the control mechanism being found in the interdependent cooperation of the several elements which may best be described in connection with their operating functions in the integrated control. Air or other fluid medium is supplied under constant pressure through an adjustable throttle valve 39a, reducing valve 39b and the line 33a to the motor positioner 32. A branch 40 of the throttled line 33a leads to a pressure regulator or controller 41 the action of which is controlled by the temperature responsive element 36 with which it is associated.

Such a controller and temperature responsive element combination is illustrated in The Bristol Company Bulletin No. A115, June 1944.

In the apparatus illustrated in Fig. 11, a change in the temperature of the lehr at the location of the temperature responsive element 36 produces a like change in temperature of the element and a proportionate change in the fluid pressure supplied by the controller 41 to the positioner 32. Within the pressure regulating range of the controller 41, each pressure variant has a corresponding temperature for the element 36.

While it is apparent that increases in controller pressure could be established by either increases or decreases in temperature, the particular embodiment illustrated in Fig. 11, provides for an increase in pressure in response to a decrease in temperature. Conversely, an increase in temperature reduces the back pressure in the controller.

The pressure of the controller 41 is supplied through a pressure line 43 to a motor regulating line 44 which controls the operation of the positioner 32 associated with the motor 33. An increase in pressure in the line 44 increases the proportion of the total pressure from the motor actuating line 33a applied on the motor diaphragm 33'. Conversely, a decreased pressure in the motor regulating line 44 decreases the pressure transmitted through the positioner to the motor diaphragm.

As heretofore explained, while the positions of the drift control dampers 6a and deflectors 7 are normally determined by the motor in accordance with the temperature of element 36, the motor also is responsive to the element 37. To that end, a three-way pneumatically actuable diaphragm and spring valve 45 normally connects the lines 43 and 44 through valve passages 45b and 45c which are maintained in communication by the action of a valve spring 46. This connection is maintained as long as the temperature responsive element 37 is above a critical temperature. However, if the temperature in the forward or heating zone of the lehr is or falls below the minimum predetermined by the element 37, a valve 37a (Fig. 11) associated with element 37 is automatically closed and full pressure of the line 33a is exerted through a branch line 33b on the actuating diaphragm of valve 45. This pressure is sufficient to overcome the action of the valve spring 46 and actuates the valve 45 so as to disconnect outlets 45b and 45c and to connect the outlets 45a and 45c and the motor control line 44 to the right-hand three-way valve 47. If now the temperature of element 36 is high enough, no pressure will be exerted on the diaphragm of valve 47 and connection will be made to outlet 47b which bleeds to atmosphere. Consequently the pressure in control line 44 falls to zero and the diaphragm of motor 33 moves the motor connecting rod 34 and the operably connected deflector assemblies 6 and 7 to the extreme forward drift inducing positions.

If, on the other hand, the temperature of element 36 were low, full pressure of line 43 would be exerted on the diaphragm of the valve 47 and the control line 44 would receive pressure through outlet 47c from a line 33c which includes a reducing valve 48 set to any desired pressure, preferably one to set the motor in the position whereat it locates the dampers 6a, and deflector assembly 7 in neutral drift inducing positions (Figs. 9 and 3 respectively).

Valves 45 and 47, as illustrated, may be of a type which causes interconnection of all of outlets at mid travel, and, therefore, it is desirable to make the outlet 47b small, as by a reducing orifice 49, so as to smooth the valve action. The orifice 49 throttles the discharge to atmosphere thus providing time, before all pressure is lost, for the valves to seat. A small bleed hole 50 also is provided in the line 33c to prevent build-up of pressure when outlet 47c is closed, dead ending the line.

It will be understood, that instead of moving the dampers 6a and the deflector assembly 7 to the extreme forward-drift inducing positions when element 37 is too cold and element 36 is still normal, any lesser percent of forward-drift could be selected by connecting line 33a with valve outlet 47b through an additional pressure regulator.

It will be apparent to those skilled in the art that modifications of the illustrated pneumatic control apparatus may be made by employing types of controls other than those shown. Thus, where a bulb type thermometer element is preferably used at 36 because it provides for closely modulated control it may not be suitable for use if the operating temperature to which it is to be exposed are higher than 1000° F. Under such conditions, a direct expansion element such as that employed in the heating zone of the lehr and designated by the numeral 37 may be employed. As best seen in Fig. 12, element 37 controls the escape of pressure fluid from line 33b by means of a spring closed ball valve 37a associated therewith.

More particularly element 37 includes a quartz rod 51 which is located in and secured to the outer or closed end of a temperature sensitive nickel alloy casing 52 which may be secured, as by the bolts 53, to the lehr so as to extend to the point at which the temperature is to be maintained by the drift control. The free end of the rod 51 bears against one end of a co-axial shaft 54 mounted for reciprocal movement along its axis. A compression spring 55 constantly urges the shaft 54 against the rod 51 so that as the casing 52 expands or contracts longitudinally the rod 51 effects a proportionate movement of the shaft 54. Pinned to the shaft 54 for reciprocal movement therewith is a radially extending arm 56 in which is threaded a valve stem 57. One end of the valve stem bears on the spring closed ball valve 37a while a hand wheel or knob 58 is pinned to the other end and provides means for manually adjusting the stem 57 relative to the arm 56. The hand wheel 58 is illustrated as having graduations thereon which are referenced to a pointer 58a for more readily manually presetting the stem 57.

In the position shown in Fig. 12, the temperature responsive casing 52 is at the critical temperature, determined by the setting of the dial 58, and the ball valve 37a is relieved of any pressure from the stem 57. Consequently, the valve 37a is closed and maintains the full fluid pressure in the line 33b on the control diaphragm of valve 45. No change in the setting of valve 37a would be effected by a decrease in temperature of the casing 52. However, an increase in temperature would permit the shaft 54 to move to the left and the stem 57 to unseat valve 37a. Consequently the pressure applied through line 33b on the diaphragm of valve 45 would be reduced and the valve would automatically connect valve passages 45b and 45c as previously described.

The embodiment of the invention thus far described, provides for control of drift and temperature in a lehr by pneumatically actuated means responsive to temperature changes at several points in the lehr.

However, it should be understood that the invention is not limited to pneumatic operation. Figs. 13 and 14 illustrate an electrical control the action of which is exactly analogous to the pneumatic control just described. Variations in temperature of a temperature responsive element 60, which corresponds to the element 36 of the pneumatic control, moves a slider 61 on a slide wire 62 of an electrical controller 63. The details of this type of apparatus are well known. The shaft 64a of an electric motor 64 is made to move to a position corresponding to that of the slider 61 through a suitable relay unit 65. The motor 64 and relay unit 65 are shown only diagrammatically, it being understood that a wide selection of motors and relays are available, particularly among those available commercially for automatically adjusting the positions of rotatable valve stems.

As illustrated in Fig. 15, such a motor may be secured to the lehr 1 and the damper and deflector positioning shaft 11 rocked in response to movement of the motor shaft 64a by means of connected rocker arms 66 and 67 respectively secured to shafts 64a and 11.

As in the embodiment previously described, if the temperature in the forward or heating zone of the lehr is or becomes colder than a predetermined minimum, a temperature responsive element 68, which may be located at the same position as element 37, operates to energize the left-hand double pole, double throw relay 69. This connects lines 70 and 71 together effecting movement of the motor shaft 64a to a predetermined position, as, for example, one in which extreme forward drift is established provided the element 60 is not too cold. If element 60 is also cold, the auxiliary contacts 72 and 72a on the controller 63 is opened, deenergizing the right-hand relay 73 and connecting lines 70 and 71 through a rheostat 74. The slider 75 of the rheostat 74 may be controlled automatically by an additional temperature responsive element or, as shown in the drawings, may be preset to a position at which the motor 64, when controlled by the rheostat, will establish a corresponding predetermined setting of the dampers 6a, deflector assembly 7. When element 68 again becomes hot enough, the left-hand relay 69 is de-energized and control is then returned to the controller 63.

The mode of operation of the electrically operated drift control is identical with that of the heretofore described pneumatic control. The like effect on temperature and drift in a lehr in which either is installed will be readily appreciated by those skilled in the art.

In practice, assuming that lever 28 has been adjusted manually to set up and maintain a predetermined flow of cooling air into the lehr for a given loading of the lehr conveyor and given service conditions, a predetermined drift condition will be established and predetermined temperatures at the elements 36 and 37, and predetermined temperature differential therebetween, will be established in the lehr. This drift condition may be zero or a certain predetermined drift or air movement in one direction or the other generally longitudinally of the tunnel. If the rate of loading should be increased or the service conditions should change so that more heat is carried toward the rear of the tunnel the resulting undesirable increase in temperature of the cooling section will effect a like increase in the temperature of element 36 (or 60). Assuming that the temperature exceeds a predetermined maximum for which the element located intermediate the heating and cooling zones has been set, the motor will be actuated to effect closing movement of the dampers 6a and movement of the deflector assembly 7 to its rearward position (Fig. 8). The result will be to build up pressure resistance to rearward movement of hot air from the hot zone and induce forward movement of cooling air.

However, if the rate of loading should be decreased or the service conditions should change so that less heat is carried toward the rear or exit end of the lehr, the resulting reduced temperature of element 36 (or 60) would automatically actuate the motor to effect a corrective adjustment of the dampers and deflector. The result will be to lower the resistance to and to induce movement of hot air toward the exit end of the tunnel.

Satisfactory operation of this phase of the automatic control may require that the main or fire box burners 3 also be automatically controlled. A thermostatic control which gives a high or low fire is customary for this purpose. Such a control may include a temperature responsive element 76 located in the fire box. If the temperature of the fire box varies from a predetermined critical point or range, element 76 will automatically effect operation of a suitable control mechanism for increasing or decreasing heat output from the burner 3.

If as the result of faulty burner operation the temperatures of the temperature responsive elements in both the heating and cooling zones of the lehr drop below their critical points, the dampers 6a, deflector assembly 7, are automatically moved to approximately neutral positions (Figs. 9, 3 and 10 respectively) which are those shown by experience to interfere least with restoring desirable temperature conditions. This automatic adjustment also is useful during start-up periods as the drift control automatically takes over its normal functions as proper temperatures are reached.

Modifications of the drift control by the use of control parts differing from those described in connection with the two illustrated embodiments will be apparent. Regardless of the method of instrumentation, the control apparatus of the present invention and the method of its operation can be said broadly to include, by means of controlling drift in a tunnel having a single source of heat and a heating and a cool zone, a close control of temperature at two points, one in or adjacent to the heating source, and the other remote from it and including, because of continuity, a practical control of gradient between the points.

The expression "temperature at a control point in the lehr tunnel" or its alternatives as used in the foregoing specification and in the appended claims, is to be understood as broad enough to include the average temperature at a predetermined transverse section of the lehr tunnel or any predetermined part thereof, as such temperature is indicated by any appropriate known form of thermostatic device.

The invention is not restricted to the illustrative embodiments thereof shown in the accompanying drawings and particularly described herein or to the operations of such embodiments but instead extends to all combinations of structural elements and method steps that fairly fall within the scope of the appended claims.

I claim:

1. Drift control apparatus for a lehr tunnel including a plurality of independently mounted temperature responsive elements located at spaced points in the tunnel, each element being independently actuated responsively to variations in its temperature, operable means movable through a range of positions for controlling atmospheric drift through the tunnel, each position in said range corresponding to a predetermined temperature for one of said elements, and means controlled by said temperature elements for moving said operable means to the position corresponding to the temperature of a temperature responsive element.

2. Apparatus as described in claim 1 wherein the means for actuating said operable drift control means is controlled by one of said temperature responsive elements independently of another of said elements.

3. Apparatus as described in claim 2 wherein said actuating means is controlled by both of said elements when the elements are below predetermined temperatures.

4. In combination with a tunnel lehr, means for discharging air into a cooling section of the tunnel of said lehr, a series of air outlets from the cooling section of the tunnel, a deflector assembly controlling at least one of said outlets, said deflector assembly including a series of spaced blades extending transversely of the tunnel for dividing and directing air discharged into said tunnel in both a forward and a reverse direction, at least one of said blades overlapping another of said blades in spaced relation so that at least a portion of the air directed by one blade is directed through one of said outlets, and the air directed by the overlapping blade is directed into the tunnel.

5. The apparatus described in claim 4 and in addition means for moving the deflector assembly longitudinally relative to the tunnel and the means for discharging air into the tunnel.

6. The apparatus described in claim 4 and in addition means for moving the deflector assembly in a forward and reverse direction relative to the tunnel and the means for discharging air into the tunnel, and automatically actuable means for regulating the supply of air into the tunnel, said means being actuated by the deflector adjusting means.

7. In combination with a tunnel having heating means located in one section thereof, means for discharging cooling air into another section thereof, means providing an air outlet from said tunnel, operable means for controlling the exhaust of air through said outlet, two spaced temperature responsive elements in said tunnel, and means responsive to each of said elements independently of the other for operating said means for controlling the exhaust of air.

8. The combination recited in claim 7 and in addition means actuated by said temperature responsive elements for controlling the cooling air discharged into said tunnel.

9. Drift control apparatus for a lehr tunnel comprising operable means for inducing and regulating drift of the atmosphere in forward and reverse directions within said tunnel, two temperature responsive elements located at spaced control points in the tunnel, and a reversible motor for actuating said drift control means responsive to variations in temperature from a selected predetermined temperature for each of said elements.

10. The apparatus described in claim 9 together with control mechanism responsive only to one of said temperature responsive elements operable when the other of said elements is at a temperature at least as high as its selected predetermined temperature for effecting operation of the reversible motor in one direction and for establishing drift in one of said drift directions when the temperature of the first element rises above the selected predetermined temperature and for effecting reversal of the motor and drift movements when the temperature of said first element falls below its predetermined temperature.

11. Drift control apparatus for a lehr tunnel comprising operable means for inducing and regulating drift of the atmosphere in forward and reverse directions within said tunnel, two temperature responsive elements located at spaced control points in the tunnel, a reversible motor for actuating said drift control means responsive to variations in temperature from a selected predetermined temperature for each of said elements means actuated by one of said elements for regulating the operation of said reversible motor in both directions to selectively effect forward and reverse drift according to temperature variations of said element above and below its predetermined temperature, secondary motor regulating means, means for operably connecting the motor and first mentioned regulating means, said connecting means being operable by the other of said temperature responsive elements to disconnect said motor and first motor regulating means and connect said motor and secondary regulating means when the said other element varies in one direction from its predetermined temperature and the first element is at a temperature less than the predetermined temperature thereof.

12. Drift control apparatus for a lehr tunnel comprising operable means for inducing and regulating drift of the atmosphere in forward and reverse directions within said tunnel, two temperature responsive elements located at spaced control points in the tunnel, a reversible motor for actuating said drift control means responsive to variations in temperature from a selected predetermined temperature for each of said elements means actuated by one of said elements for regulating the operation of said reversible motor in both directions to selectively effect forward and reverse drift according to temperature variations of said element above and below its predetermined temperature, secondary motor regulating means, means for operably connecting the motor and first mentioned regulating means, said connecting means being operable by the other of said temperature responsive elements to disconnect said motor and first motor regulating means and connect said motor and secondary regulating means when the said other element varies in one direction from its predetermined temperature and the first element is at a temperature less than the predetermined temperature thereof, a third motor regulating means, and means associated with said secondary means for disconnecting said secondary means and connecting said third motor regulating means when the temperature of the first temperature responsive element is at least as high as its predetermined temperature.

13. The combination with a tunnel lehr having a cooling section and a heating section, means for discharging a cooling medium into said cooling section, means movable relative to said discharge means between two limiting positions, said means in an intermediate position being constructed and arranged to minimize atmospheric drift in the tunnel, forward drift being increasingly induced by successive positions of said means towards one of said limiting positions and reverse drift similarly induced by successive positions towards the other of said limiting positions, a motor for positioning said means, a first temperature responsive element located in said heating section and having a preselected critical temperature, a second temperature responsive element remote therefrom in the tunnel and having a lower preselected critical temperature, control means responsive to said second element and connectable with the motor to move the drift inducing means, increases in temperature above the critical temperature effecting movement of said drift inducing means progressively towards the maximum forward drift inducing position and like decreases in temperature effecting movement towards the maximum reverse drift position, means actuated by said first element for connecting the control means to the motor when the first element is at least at its critical temperature, operable means controlled by said second element and having two positions one of which when said means is connected to the motor effects movement of the drift inducing means to the maximum forward drift inducing position and the other of which effects movement of the drift inducing means to neutral position, the first of said positions of the said operable means being assumed when the temperature of said second element is at least as high as its critical temperature and the neutral drift inducing position being assumed when the temperature is below the critical, said operable means being connected to the motor by said means actuated by said first element when the temperature of said first element is below its critical.

14. The combination of elements described in claim 13 and in addition means actuated by the motor to increase the flow of cooling medium to the cooling section when the drift inducing means is moved to a limiting position.

15. The method of controlling temperature in a tunnel lehr having a tunnel comprising a heated section and a cooling section and through which the ware to be annealed is passed, which comprises discharging air into the cooling section of the lehr tunnel at a plurality of places spaced longitudinally of said cooling section, venting air from said cooling section at a plurality of places spaced along the length thereof, increasing the amount of air thus vented in relation to the air supplied to the cooling section of the lehr tunnel when the temperature in the lehr tunnel at a control point in advance of said cooling section falls below a predetermined temperature and decreasing the amount of air vented from the cooling section in relation to the amount of air supplied thereto when the temperature at a second control point in the heated section drops below a higher predetermined temperature.

16. Drift control apparatus for a lehr tunnel comprising operable means for inducing and regulating drift of the atmosphere in a forward and a reverse direction within said tunnel, first and second temperature responsive elements located at spaced control points in the tunnel, and a reversible motor for actuating said drift control means responsive to variations in temperature from a selected predetermined temperature for each of said elements, the operation of said motor being responsive to variations in temperature of the first temperature responsive element independently of the second element when said second element is in a predetermined temperature range, said motor being responsive to the second element independently of the first element when said second element is outside of said temperature range.

DONALD G. MERRILL.

REFERENCES CITED

The following references are of record in the file of this patent:

UNITED STATES PATENTS

| Number | Name | Date |
|---|---|---|
| 1,974,058 | Wadman | Sept. 18, 1934 |
| 2,106,678 | Merrill | Jan. 25, 1938 |
| 2,120,452 | Amsler | June 14, 1938 |
| 2,238,791 | Dorsey | Apr. 15, 1941 |